US012043330B2

(12) United States Patent
van den Brink

(10) Patent No.: US 12,043,330 B2
(45) Date of Patent: Jul. 23, 2024

(54) SELF-BALANCING TILTING VEHICLE WITH TILTING PRIORITY

(71) Applicant: Carver B.V., 's-Gravendeel (NL)

(72) Inventor: Christopher Ralph van den Brink, 's-Gravendeel (NL)

(73) Assignee: Carver B.V., 's-Gravendeel (NL)

(*) Notice: Subject to any disclaimer, the term of this patent is extended or adjusted under 35 U.S.C. 154(b) by 544 days.

(21) Appl. No.: 17/298,077

(22) PCT Filed: Nov. 26, 2019

(86) PCT No.: PCT/NL2019/050784
§ 371 (c)(1),
(2) Date: May 28, 2021

(87) PCT Pub. No.: WO2020/117046
PCT Pub. Date: Jun. 11, 2020

(65) Prior Publication Data
US 2022/0048564 A1     Feb. 17, 2022

(30) Foreign Application Priority Data
Dec. 3, 2018  (NL) ..................... 2022123

(51) Int. Cl.
*B62D 9/02* (2006.01)
*B60L 1/00* (2006.01)
(Continued)

(52) U.S. Cl.
CPC ............... *B62D 9/02* (2013.01); *B60L 1/003* (2013.01); *B60L 7/10* (2013.01); *B60L 50/66* (2019.02);
(Continued)

(58) Field of Classification Search
CPC . B62D 9/002; B60L 1/00; B60L 1/003; B60L 7/10; B60L 50/60; Y02T 10/70; B60K 1/04
See application file for complete search history.

(56) References Cited

U.S. PATENT DOCUMENTS 3,023,023 A    2/1962  Wilson
3,781,031 A   12/1973  Patin
(Continued)

FOREIGN PATENT DOCUMENTS

CA       2652789 A1    8/2010
CN    108377009 A  *  8/2018  ............ B60L 3/0046
(Continued)

*Primary Examiner* — James A English
(74) *Attorney, Agent, or Firm* — N.V. Nederlandsch Octrooibureau

(57) ABSTRACT

A self-balancing tilting vehicle comprising a rear frame section having two drive wheels and a front frame section having at least one front wheel, connected to the rear frame section such as to be tiltable about a tilt axis that extends in a length direction, the front frame section carrying a driver seat, the rear frame section comprising an electric propulsion drive for rotating the drive wheels, an electric tilting drive for tilting the front frame section about the tilting axis and a power generating unit, the front wheel being rotatable about a steering axis that extends transversely to the tilt axis, characterised in that the drive unit of the tilting vehicle is cut off well before the tilting drive.

10 Claims, 7 Drawing Sheets

(51) Int. Cl.
  *B60L 7/10* (2006.01)
  *B60L 50/60* (2019.01)
  *B62D 23/00* (2006.01)
  *B62D 31/00* (2006.01)
  *B62D 61/08* (2006.01)
  *B60K 1/04* (2019.01)

(52) U.S. Cl.
  CPC ......... *B62D 23/005* (2013.01); *B62D 31/003* (2013.01); *B62D 61/08* (2013.01); *B60K 2001/0416* (2013.01); *B60L 2200/24* (2013.01); *B60L 2220/46* (2013.01); *B60Y 2200/112* (2013.01); *B60Y 2200/122* (2013.01)

(56) References Cited

U.S. PATENT DOCUMENTS

| | | | |
|---|---|---|---|
| 3,944,014 A | 3/1976 | Maisch et al. | |
| 4,064,957 A | 12/1977 | Parham | |
| 4,423,795 A | 1/1984 | Winchell et al. | |
| 4,484,648 A | 11/1984 | Jephcott | |
| 4,529,055 A | 7/1985 | Gotoh et al. | |
| 4,546,997 A | 10/1985 | Smyers | |
| 4,624,469 A | 11/1986 | Bourne, Jr. | |
| 4,660,853 A | 4/1987 | Jephcott | |
| 4,678,053 A | 7/1987 | Watanabe et al. | |
| 4,987,542 A | 1/1991 | Tran | |
| 5,116,069 A | 5/1992 | Miller | |
| 5,315,868 A | 5/1994 | Jacobi et al. | |
| 5,483,452 A | 1/1996 | Tanaka | |
| 5,921,338 A | 7/1999 | Edmondson | |
| 5,927,424 A | 7/1999 | Van Den Brink et al. | |
| 6,170,838 B1 | 1/2001 | Laurent et al. | |
| 6,328,125 B1 | 12/2001 | Van Den Brink et al. | |
| 6,435,522 B1 | 8/2002 | Van Den Brink et al. | |
| 6,467,783 B1 | 10/2002 | Blondelet et al. | |
| 6,655,710 B2 | 12/2003 | Lindell et al. | |
| 6,863,288 B2 | 3/2005 | Van Den Brink et al. | |
| 8,136,613 B2 | 3/2012 | Schaedler et al. | |
| 8,141,890 B2 | 3/2012 | Hughes et al. | |
| 8,249,775 B2 | 8/2012 | Van Den Brink | |
| 8,781,684 B2 | 7/2014 | Bruce | |
| 8,944,191 B2 | 2/2015 | Schaedler et al. | |
| 9,821,620 B2 | 11/2017 | Saeger et al. | |
| 10,046,797 B2 | 8/2018 | Schaedler et al. | |
| 10,526,033 B2 | 1/2020 | Horiguchi et al. | |
| 10,633,046 B2 | 4/2020 | Van Wijk et al. | |
| 10,723,381 B2 | 7/2020 | Thompson | |
| 10,745,048 B2 | 8/2020 | Schaedler et al. | |
| 2006/0069488 A1* | 3/2006 | Sychra | B60L 7/26 701/69 |
| 2007/0276566 A1 | 11/2007 | Diebold | |
| 2009/0194961 A1 | 8/2009 | Dieziger | |
| 2013/0193656 A1* | 8/2013 | Itoh | B62K 5/10 280/5.509 |
| 2018/0290684 A1* | 10/2018 | Suda | B60W 30/04 |
| 2020/0262262 A1 | 8/2020 | Araki | |

FOREIGN PATENT DOCUMENTS

| | | | |
|---|---|---|---|
| CN | 108377009 A | 8/2018 | |
| EP | 0592377 A1 | 4/1994 | |
| EP | 1516806 B1 | 7/2008 | |
| FR | 1158922 A | 6/1958 | |
| FR | 2338836 A1 | 8/1977 | |
| FR | 2646379 B1 | 6/1994 | |
| GB | 2155410 B1 | 9/1985 | |
| GB | 2374327 A | 10/2002 | |
| GB | 2456352 A1 | 7/2009 | |
| JP | H08127219 A | 5/1996 | |
| WO | 8503678 A | 8/1985 | |
| WO | 9912795 A1 | 3/1999 | |
| WO | 02068228 A1 | 9/2002 | |
| WO | 2006006859 A2 | 1/2006 | |
| WO | 2006006859 A3 | 3/2006 | |
| WO | 2007119918 A1 | 10/2007 | |
| WO | 2011121211 A1 | 10/2011 | |
| WO | 2014022315 A2 | 2/2014 | |
| WO | WO-2014022315 A2 * | 2/2014 | ............. B60T 8/241 |

* cited by examiner

SELF-BALANCING TILTING VEHICLE WITH TILTING PRIORITY

FIELD OF THE INVENTION

The present invention relates to a self-balancing tilting vehicle comprising a rear frame section having two drive wheels and a front frame section having at least one front wheel, connected to the rear frame section such as to be tiltable about a tilt axis that extends in a length direction, the front frame section carrying a driver seat, the rear frame section comprising an electric propulsion drive for rotating the drive wheels, an electric tilting drive for tilting the front frame section about the tilting axis and a power generating unit, the front wheel being rotatable about a steering axis that extends transversely to the tilt axis.

BACKGROUND ART

Such a self-balancing tilting vehicle is known from WO95/34459, describing a vehicle in which the front wheel can freely pivot about a generally vertical front suspension axis. The steering wheel that is operated by the driver, is controlling two hydraulic cylinders that pivot the front frame section in which the driver is seated, about the longitudinal tilt axis. A sensor on the front wheel measures the force or torque that acts on the front wheel and interrupts the action of the tilting cylinders when this force or torque is below a pre-determined threshold value, for instance zero. If, at a certain speed, the driver turns the steering wheel to the right, this actuates the tilting cylinders and the front frame section will start to tilt away from the vertically upright position, to the right. The front wheel, that is freely suspended, experiences a torque and will start to tilt to about the front fork axis, causing the vehicle to move into a right curve. When the torque on the front wheel returns to zero, the tilting is interrupted, and the tilting position of the front frame part will be maintained at the right angle, that matches with the velocity, the radius of the curve driven and the weight of the front frame part, including the driver.

In WO99/14099 a self-balancing tilting vehicle having a rotation sensor coupled to the front wheel is described. The rotation sensor measures the difference in rotation between the front wheel about its front fork axis and the rotation input obtained from the driver by turning the steering wheel and operates the tilting cylinders on the basis of this difference signal. This results in improved handling and ease of driving.

In WO99/24308 a self/balancing tilting vehicle comprising an opposite lock power cylinder attached to the front steering wheel, so that the tilting section will easily fall into the bend, when the steering wheel is turned by the driver.

The above tilting vehicles are driven by a combustion engine and involve a relatively heavy hydraulic tilting mechanism.

When the tilting vehicle runs out of fuel, the engine is no longer operable. As a result, not only will the vehicle loose propulsive power, but also the tilting mechanism will no longer be operable. Once propulsive power has been lost, however, the vehicle may still be moving in a driving direction with some velocity. The loss of operation of the tilting mechanism, in this situation, results in a difficult to handle vehicle, which may even lead to dangerous situations.

SUMMARY OF THE INVENTION

It is another object of the present invention to provide a tilting-vehicle that requires relatively little energy for tilting and propulsion.

It is a further object of the present invention to provide an electric self-balancing tilting vehicle which is light-weight, and of a compact construction.

It is an object of the present invention to provide a tilting vehicle which can be safely operated at low energy levels of the power generating unit.

Hereto the vehicle according to the invention is characterized in that the tilting vehicle further comprises a controller, which is with an output connected to the propulsion drive and to the tilting drive and which is with an input connected to the power generating unit. The controller is receiving an energy level indication from the power generating unit source and is adapted to reduce the energy supplied to the propulsion drive when the indicated energy level is below an energy level threshold value, while maintaining the energy supplied to the tilting drive above a predetermined minimum value.

The controller normally distributes the energy from the power generating unit, which can for instance be a battery or a fuel cell, to the propulsion and tilting drives as required. Once the available energy falls below a predetermined available energy threshold value, the amount of energy distributed to the propulsion drive will be decreased to ensure sufficient energy will remain available to run the tilting drive as required to retain good manoeuvrability of the vehicle, enabling a driver to safely reach a refuelling-location. Thus, the controller prevents the loss of tilting control. In addition, the driver may be alerted via a signal in the front frame section, generated by the controller when the indicated energy level is below the energy lever threshold value. Through the alert signal, the driver is made aware that the energy supplied to the propulsion drive is being limited and that he needs to refuel the vehicle within a certain distance.

The controller may, on the basis of a driver input and the vehicle state, control the tilting drive, causing the vehicle to tilt such that the vehicle may drive comfortably into a curve at the driven velocity. The driver input will generally be a steering force, while the vehicle state may be the vehicles driving velocity and/or acceleration. Various solutions can be applied for the connection and for the interaction between sensors measuring the driver input and vehicle state. A mechanical, hydraulic, electrical or electronic method of operation, or a combination thereof is conceivable, including a hydraulic tilting and steering mechanism. Preferably, the connection and interaction is achieved through a combination of an electrical or electronic measurement and control system based on electrical or electronic sensors, wherein one or more tilting elements are controlled electrically or mechanically. Particularly suitable are integrated micro electronic circuits on which measurement and control algorithms can be programmed with the aid of appropriate software. By incorporating integrated micro electronic circuits into the system, it is possible to achieve rapid optimization of the measurement and control parameters. Additionally, the integrated micro electronic circuits make it possible to configure the tilting behavior of the vehicle in the form of preprogrammed settings and to call these up as required. The power generating unit may be arranged to comprise a single or multiple sections feeding the various drives.

Advantageously, electric drive motors and their associated structures are compact and light when compared to other types of propulsion which could be implemented, such as combustion engines. Thus by including the electric drive motors in the tilting vehicle, the vehicle can be more light-weight than if another propulsion system were to be used, requiring less energy to be operated.

According to an aspect of the invention, the controller receives a velocity signal and a steering input signal indicating a driving direction, the controller being adapted to operate the tilting drive as long as the velocity of the vehicle is above a predetermined threshold value. The controller is set-up such that the tilting drive is fully operable as required to match any steering input signals until the vehicles speed has dropped below a predetermined speed threshold value, which may be when the vehicle has come to a complete stand-still. To ensure the tilting drive remains operable as long as the vehicle is moving at a speed above the predetermined threshold value, the amount of energy released to the propulsion drive is gradually decreased, increasingly limiting the maximum driving velocity of the tilting vehicle. The controller is arranged such that, when the available energy is below the energy level threshold value, the implemented decrease in maximum driving velocity and available energy allow for a range of at least 10 km being driven at a decreased maximum driving velocity of 50 km/h, providing sufficient range for the vehicle to reach a refuelling location at a reasonable driving velocity. When the vehicle velocity drops below the predetermined threshold value, which may for example be 3 km/h, the vehicle will hardly be moving such that tilting the vehicle will no longer make a significant contribution to the manoeuvrability of the vehicle. Thus, when driving on a substantially flat road with a very low energy level which causes the propulsion drive to drive the vehicle at a speed below the threshold value, the tilting drive may no longer receive sufficient power for (large) tilting motions. However, when driving down-hill at the same very low energy level, the tilting drive will be fully operable due to the vehicle velocity being above the predetermined threshold value, ensuring the vehicle reaches the bottom of the hill safely. The controller may be adapted such that a minimum energy reserve is maintained to be used for maintaining safe conditions until the vehicle is switched off. Alternatively, the energy for fully operating the electric tilting drive may be generated by the electric propulsion drive through the drive wheels being rotated by the vehicle moving down-hill under gravity and directed to the tilting drive.

According to another aspect of the invention, the drive wheels are each driven by a respective electric drive motor, the controller being connected to the electric drive motors of the wheels.

By providing an individual electric drive for each rear wheel, the rear wheels can be operated at different and at equal speeds, torques or rotational directions. Driving the outside rear wheel with more positive torque and the inside rear wheel with a less positive or negative torque causes a moment on the rear frame section about a substantially vertical axis and may assist turning the front wheel and thereby the vehicle into a curve. It was found that providing an individually controlled electric motor for each rear wheel greatly improves handling of the tilting vehicle in a large range of speeds and under widely varying driving conditions, as the torque steering can be used to assist and/or balance the turning motion of the vehicle when steered into a bend. Thus the controller may be adapted to operate the electric motors at mutually different torques, speeds or rotational directions when the driving direction is a curve, whereby, when at low vehicle speeds, the torque difference on the rear drive wheels will be such that the directional change as intended by the driver will be amplified. As a result less steer force is required to change direction. At very low speeds, as commonly used during heavy traffic and special maneuvers, the vehicle may change direction without using any tilting. While at higher vehicle speeds the tilting motion may be supported by a torque difference that is generated on the rear drive wheels in response to a steering motion, whereby initially a change in direction as intended by the driver is attenuated, such that the tilting motion of the vehicle is initiated prior to the directional change. As a result, no significant increase in required tilting power arises when driving at higher vehicle speeds, allowing the tilting drive of the tilting vehicle being rated for average driving velocities of about 50 km/h and thus also being reasonably small and light-weight.

According to a further aspect of the invention, the tilting drive comprises an electric motor situated at a predetermined distance from the tilt axis with a gear, and a tilting member having a toothed surface engaging with the gear such that the tilting member can be displaced transversely to the tilting axis by rotation of the gear, whereby the tilting drive and the tilting member are connected to the respective front and rear frame sections. The tilting mechanism according to the invention, which for instance may comprise a rack and pinion drive, can be easily installed, inspected, disassembled and maintained and adjusted to be in play free operational state and provides for safe and reliable tilting. The toothed surface of the tilting member provides for a regular and stable motion of the tilting member transversely to the tilting axis, which is accurately controllable. The tilting member may remain stationary with respect to either the front or rear frame section, as the drive member moves along the toothed surface to tilt the front frame section with respect to the rear frame section, resulting in a compact construction of the tilting mechanism in comparison to other well-known tilting mechanisms, which are generally hydraulic systems. As a result, the electric tilting drive, acting via a toothed gear on the toothed surface of the drive member, provides a reduced-weight tilting mechanism that can rapidly and reliably tilt the front frame section into the required position. This is based on the insight that a relatively light weight electric motor can provide a large tilting moment by placing this motor at a predetermined distance from the tilt axis to obtain a large tilt moment. As the tilting forces that are required, especially for speeds suitable for city traffic, i.e. below 50 km/h, are more or less constant and relatively low, a light-weight electric motor can operate in conjunction with the toothed tilting member to achieve a reliable tilting operation, resulting in the tilting drive having a low power consumption. Due to the relatively low power consumption, a larger range can be achieved with the same amount of energy available. Furthermore, due to the relatively low power consumption required for operating the tilting drive, decreasing the amount of energy available for the propulsion drive can be done relatively late and/or at a low rate.

According to an aspect of the invention, the power generating unit comprises a battery, providing power to the drive wheels and to the tilting drive. Through the use of a battery both the propulsion drive and electric tilting drive can be powered in a simple way from a single source, without requiring heavy connection means between the power source and both drives. During linear driving motions, the majority of power from the battery is used for driving the drive wheels, while the tilting drive is in a neutral position, keeping the front frame section straight up. When a force or moment is exerted on the steering axis of the vehicle in order to make the vehicle change direction—either by a driver or by the control system of a self-driving vehicle—this force or moment is monitored by a steer force sensor while simultaneously the vehicle's speed is measured by a speed sensor. A vehicle controller is arranged to generate, on the basis of the steer force sensor signal and the velocity signal, a control of the tilting drive, which causes the vehicle to tilt such that the vehicle may turn comfortably at the driven velocity.

Advantageously, the weight of a battery does not vary with the amount of energy contained therein. As a result, the overall weight of the vehicle and it's centre of gravity will be constant. To ensure a stable basis for effectively rotating the front frame section relative to the rear frame, the battery may be included in the rear frame such that the weight of the rear frame section is relatively high in comparison to the front frame section. This stability is provided regardless of the position of the rear frame section, thus even, for example, when driving on uneven roads or surfaces with limited grip.

According to another aspect of the invention, the electric motor comprises a housing with a motor member, a transmission gear connected to the drive gear and a resilient brake member which blocks rotation of the drive gear when no electrical energy is supplied to the motor member. The transmission gear allows the electric motor to operate the drive gear at optimum energy usage. Through the addition of the brake member, the tilting of the vehicle is lockable by locking the position of the drive gear along the toothed surface of the tilting member for instance when the power is off due to running out of energy and/or when the vehicle velocity is below the predetermined threshold value.

When the resilient brake member is activated, the front frame section is locked to the rear frame section. By the activation of the locking mechanism, tilting of the frame is thus no longer possible, allowing the vehicle to be in a rigid and safe position for disembarking the vehicle and leaving it unattended if necessary, as the vehicle cannot cause damage to other nearby objects due to unexpected tilting.

According to a further aspect of the invention, the controller is adapted to transport energy that is generated from an electric drive motor to the tilting drive. By including this set-up in the vehicle, the range of the vehicle may be further extended. During for instance breaking actions or the vehicle driving downhill (in neutral), energy can be regenerated by the electric motors. This energy can then be directly used for tilting motions, thereby saving energy from the battery. Alternatively, if no tilting is required immediately or if more energy is generated than required for tilting, the energy can be stored in the battery, thereby adding to the available energy therein.

SHORT DESCRIPTION OF DRAWINGS

Embodiments of a tilting vehicle according to the present invention will be described by way of example, with reference to the attached drawings, in which FIG. 1 shows a perspective view of a tilting vehicle in a tilted state.

DESCRIPTION OF EMBODIMENTS

Figure 1:
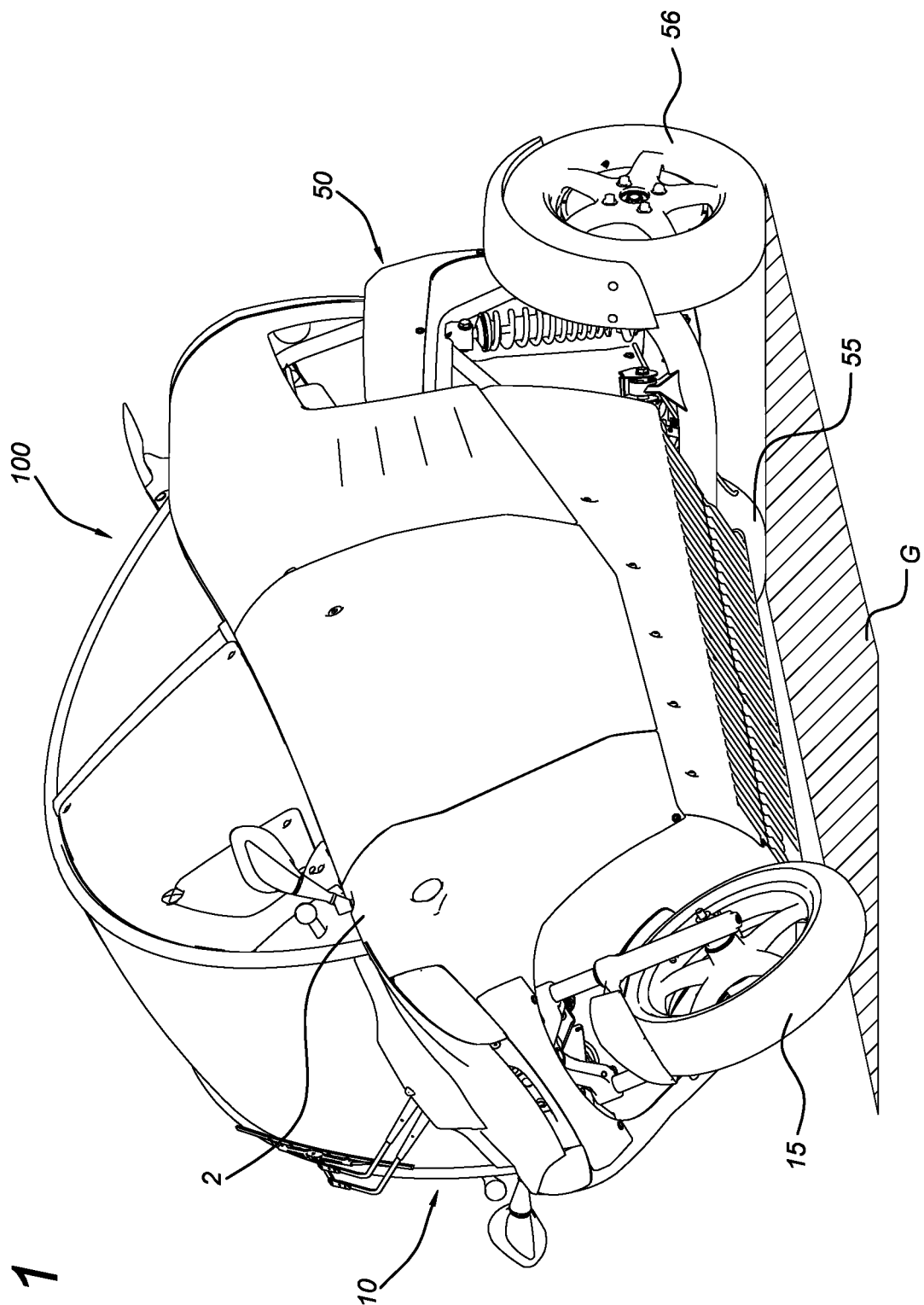

FIG. 1 shows a perspective view of a tilting vehicle 100 in a tilted position. The tilting vehicle 100 comprises a front frame section 10 with a front wheel 15 and body panels comprising a side panel 2 and a rear frame section 50 with two drive wheels 55, 56. The front fame section 10 is connected to the rear frame section 50 in such a manner that the frame sections are tiltable with respect to each other. When a ground plane G onto which the tilting vehicle 100 is positioned is substantially flat, generally the front frame section will be tilting with respect to the rear frame section, offering a driving experience similar to that of driving a motorbike, when driving through bends.

Figure 2:
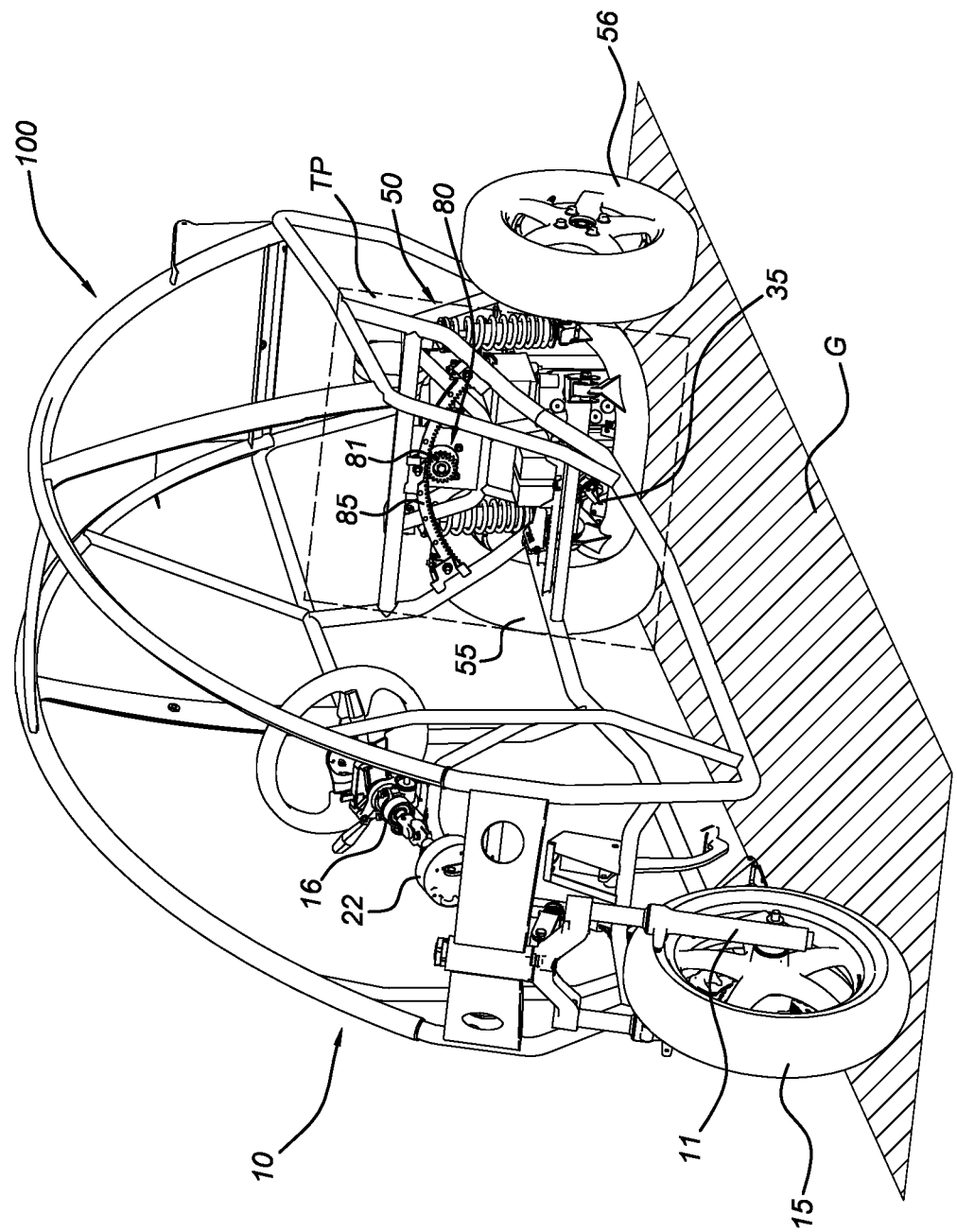
FIG. 2 shows a perspective view of structure of the tilting vehicle according to FIG. 1 without body panels and in an un-tilted state.

FIG. 2 shows a perspective view of structure of the tilting vehicle 100 according to FIG. 1 without body panels and in an upright position. The connection between the front and rear frame sections is shown to comprise a hinge 35 and a tilting mechanism, having a rack 85 and pinion drive 80 wherein the pinion 81 of the pinion drive is movable along a curved and toothed lower surface of the rack 85. The tilting mechanism allows controlled tilting of the front frame section with respect to the rear frame section along the entire toothed surface of the rack 85. As a result, the front frame section 10 is moveable between a first extreme tilted position in which the front frame section 10 is tilted around a longitudinal tilting axis TA (see FIG. 3) towards the side of the first drive wheel 55 and a second extreme tilted position in which the front frame section 10 is tilted towards the side of the second drive wheel 56.

Figure 3:
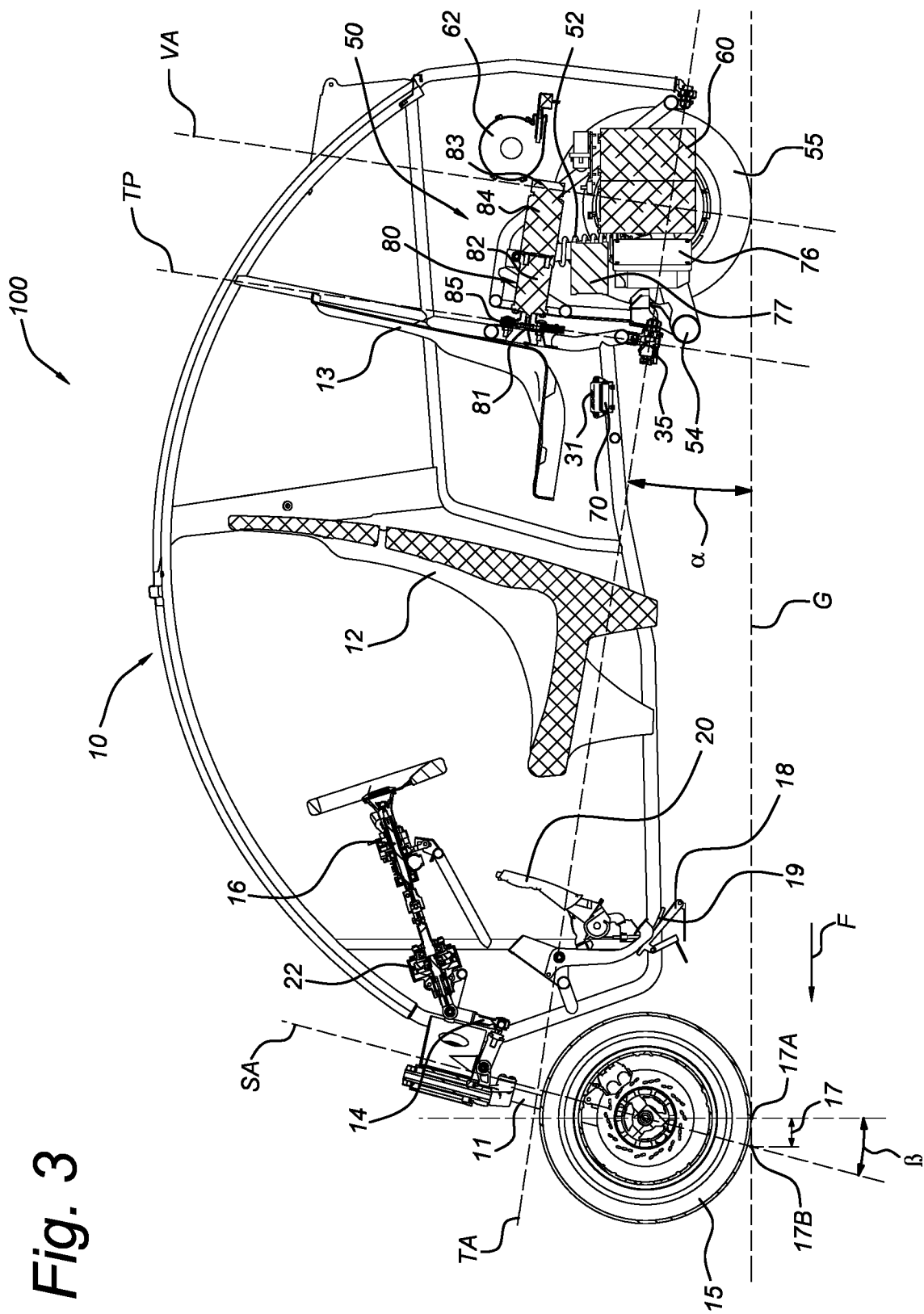
FIG. 3 shows a longitudinal cross-section of the tilting vehicle of FIG. 1.
Figure 4:
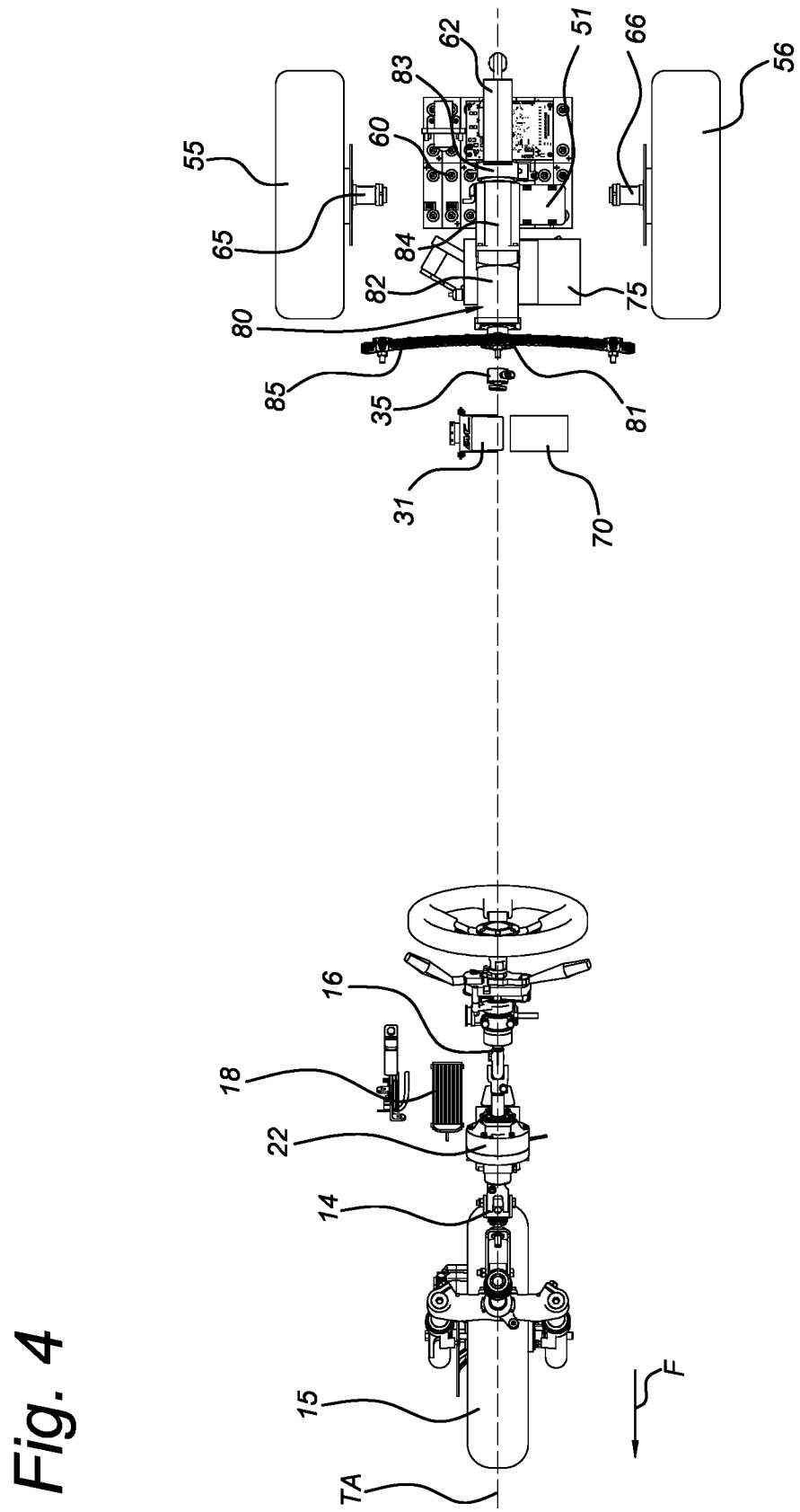
FIG. 4 shows a top view of the tilting system components of the tilting vehicle of FIG. 1.

FIGS. 3 and 4 respectively show a longitudinal cross-section and a top view of the tilting vehicle 100 of FIG. 1. FIGS. 3 and 4 show the front frame section 10 with the one steering front wheel 15 mounted on a front fork 11, a driver seat 12, a passenger seat 13, a steering member or handle bar 16, the curved tilting rack 85, a set of sensors 22, a front frame G-sensor and gyroscope 31 and a controller 70, as well as an acceleration pedal 18, a brake pedal 19 and a drive and reverse selection member 20, for selecting a driving direction of the vehicle. The listed components are set up in a regular driving arrangement, allowing a driver in the driver seat 12 to operate the acceleration pedal 18, brake pedal 19, drive and reverse selection member 20 and handle bar 16, which are located within normal reaching distance in front of the driver seat. The passenger seat 13 is shown to be located directly behind the driver seat 12. This set-up allows the front frame section design to remain as narrow and sleek as possible, contributing to better aerodynamics and handling properties and reduces the vehicle's footprint. Alternatively, however, the seats may be positioned side by side, or only a driver seat 12 may be present.

The front wheel 15 is attached to the front frame section 10 via the front fork 11 which is rotatable about a steering axis SA located in the vertical plane, substantially perpendicular to the tilt axis TA. The front fork 11 is angled such that the axis reaches the ground at point 17B, which is located in front of the contact point 17A of the wheel with the ground. The caster angle β between the steering axis SA and a vertical axis through the contact point 17A of the wheel with the ground is about 7-8°. This results in a positive caster and generates a moment around the steering axis SA that will bring the front wheel 15 back to a straight-ahead equilibrium position. The trail 17, the distance along the ground surface G between the contact point 17A and the point 17B at which the steering axis SA reaches the ground, provides the degree of self-centring for the steering. Thus, by designing the front frame section such that the front fork 11 is at a caster angle β the vehicle is easier to control and has improved directional stability.

The front fork 11 is mechanically connected to the handle bar 16 through a linkage 14, allowing a driver of the vehicle to rotate the front wheel in a desired driving direction. This linkage 14 is constructed as a transmission with steering rods. Alternatively, the linkage can be a direct coupling, as for example the case of a conventional motor bicycle, or consist of control cables or an hydraulic or electrical actuator. Furthermore, it will be obvious that other steering means may be implemented in addition to or instead of the aforementioned options, in order to provide the vehicle with an auto-pilot function or to provide an autonomous vehicle using the same inventive concept. The sensors 22 are shown as being attached to the handle bar 16. The sensors 22 comprise a steering force sensor and a steering angle sensor, which are coupled to the steering shaft of the front wheel in such a way that the sensors register the steer force exerted by the driver via the handle bar 16 and the wheel caster, the sensor also measures the steering angle. An integrated steering angle and steering force sensor is available in the industry.

Additionally a reversing sensor and a speed sensor are positioned in the front wheel 15 (not shown). The G-sensor and gyroscope 31 are positioned at the bottom of the tilting frame, near the controller 70. All measurements are transferred to a controller 70 located under the passenger seat 13 of the front frame section 10. The sensors are discussed in more detail in reference to FIG. 7.

The rear frame section 50 comprising the drive wheels 55, 56 is shown to further comprise a rear axle suspension body 54 for connecting the drive wheels to the rear frame section, and shock absorbers 52, as well as a main drive battery 60, a battery management system 78, a battery charger 62, electric drive motors 65, 66, the tilt drive 80 and a rear frame G-sensor and gyroscope 51. The shock absorbers 52 are connected between the rear frame and the rear axle suspension body 54 at the location where the drive wheels 55, 56 are attached. The drive wheels are each equipped with independent electric hub motors 65, 66, and independently connected to the battery 60 located in the rear frame section 50, via the battery management system 78, for electric power. Further, both hub motors 65, 66 are in communication with the controller 70 such that the drive wheels can be driven independently, allowing a difference in torque being generated between the drive wheels 55, 56 of the vehicle. In this set-up the controller 70 is arranged to control the electric motors 65, 66 individually, allowing them to be run at different velocities, torques and/or directions from each other. Additionally, the controller 70 is arranged to redirect any regenerated electricity resulting from a braking action on one wheel to the other electric motor of the other wheel that is run at a higher speed or torque.

The front frame section 10 is connected to the rear frame section 50 via a hinge 35 defining the rotation point around which the front frame section can be tilted. The distance between the hinge 35 and the pinion 81 defines the tilting moment arm. The tilting axis TA defines a longitudinal centerline of the tilting vehicle around which the wheels 15, 55, 56 are symmetrically spaced and which axis is at an angle α with respect to a ground plane G onto which all three wheels of the vehicle are resting such that the tilting axis is sloped downwards in the direction of the rear of the vehicle. The angle α of the tilting axis is about 7-8 degrees. The tilting rack 85 and tilt drive 80 are engaged at some distance above the hinge 35 seen in the tilting plane TP, for controlling the tilting motion of the front frame section 10 along the curvature of the tilting rack 85. Hereto the tilting drive 80 comprises the pinion 81, an electromotor 84, a gear box 82 and a tilt lock 83, which can be electrically disengaged.

Figure 5:
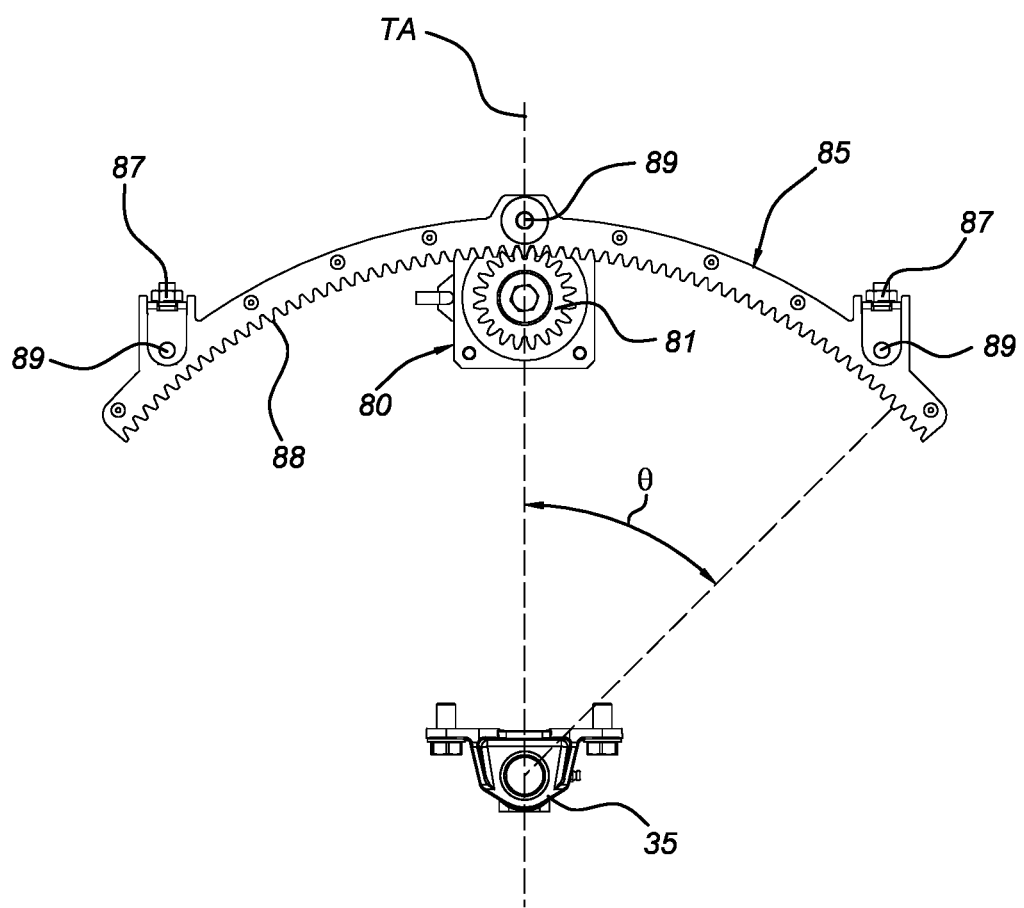
FIGS. 5 and 6 show in more detail the tilting mechanism as used in the vehicle according to FIG. 1.
Figure 6:
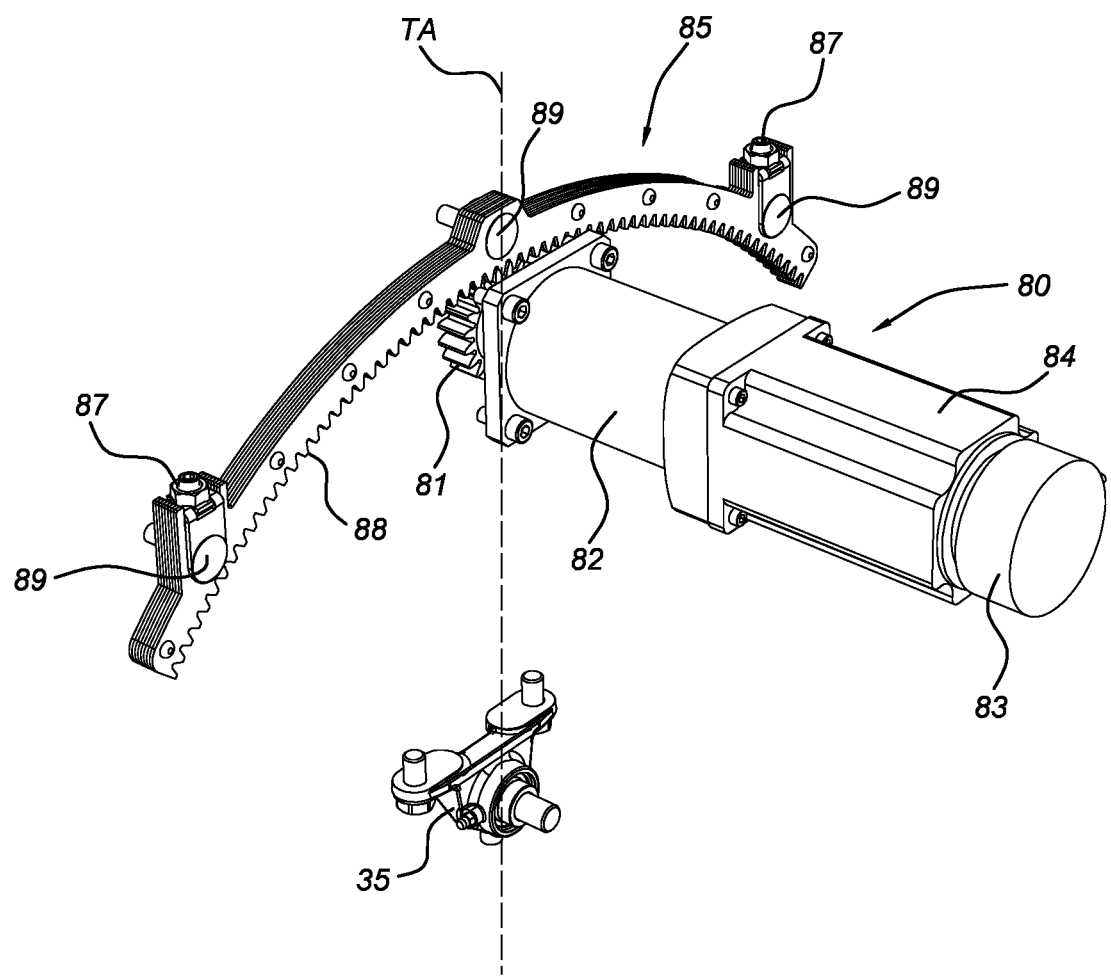

The tilting member or rack 85 is described further for FIGS. 5 and 6, which show the tilting mechanism in more detail. The tilting mechanism is shown to comprise the tilting member 85 and the tilting drive 80. The tilting member 85 is a curved rack, with a toothed surface 88 on the inside of the curve and comprises attachment bolts 89, and an adjustment mechanism 87. The tilting drive 80 is shown as comprising the pinion 81, the electromotor 84, the gear box 82 and the tilt lock 83. The electromotor 84 is connected to the pinion 81 via the gear box, which gear box 84 is set up to translate a high torque of the electromotor 84 to a higher rotation of the pinion 81. The gear box transmission is about 1:24. The rack 85 is connected to the front frame section 10 (not shown here) via attachment bolts 89, which are located at both ends and in the centre of the tilting member. When attached, the tilting member is situated such that the rotational center of the partially circular frame coincides with the hinge connection 35 of the front and rear frame sections 10, 50, such that the plane of symmetry of the tilting member is perpendicular to the tilting axis TA. Additionally, the adjustment mechanism 87 is arranged between the ends of the tilting member and the frame (not shown), for controlling an offset from an initial mounting position of the rack 85 with respect to the frame 50 in the tilting plane TP.

The adjustment mechanism 87 has adjusting screws at both ends of the rack 85, which allow easy manual adjustment as required. When the rear frame section 50 is connected to the front frame section 10 at the hinge connection 35 previously discussed in relation to FIGS. 3 and 4, the pinion 81 of the tilting drive 80 should accurately engage with the toothed surface 88 such that the pinion 81 can rotate along the entire toothed surface 88 smoothly. This smooth interaction is achieved by adjusting the position of the rack 85 with respect to the front frame section 10 to which it is connected, whereby a distance between either end of the tilting member 85 and the hinge connection 35. During the operational life of the vehicle 100, the toothed surface 88 and pinion 81 will experience wear and tear, which can be compensated by intermitted adjustments of the position of the rack 85 prolonging the lifetime for both components. When worn out, the rack 85 can easily be removed and replaced through the bolted attachments 87 to the frame.

The electromotor 84 of the tilting drive 80 is controlled by a motor controller mounted in the rear frame and is also connected to the battery 60 for electric power. In the vehicle 100 as depicted in the previous Figures, the amperage and voltage to the electromotor 84 are controlled by the tilt motor controller as imposed by the main controller 70. Thus, the main controller 70 ultimately controls the activation of the tilting motion between the front frame section 10 and the rear frame section 50. The tilt lock 83 mechanically locks the tilting angle θ of the front frame section 10 with respect to the rear frame section 50 when the vehicle is in a parking position and no power is supplied.

When the electrical power is switched on, thus when the vehicle 100 is in use, the tilting drive 80 is mainly controlled depending on input provided to the main controller 70 by the sensors 22, the gyroscope and G-sensor 31 in the front frame section 10 and the gyroscope and G-sensor 51 in the rear frame section 50 in order to keep the vehicle upright. Upon switching on the vehicle. the tilt lock 83 is electrically disengaged so the front frame section 10 can tilt actively. If the rear frame section 50 of the vehicle is not fully horizontal while no steering input is provided, the front frame section 10 of the vehicle 100 will be put in the upright position. When driving on an angled road surface or with one wheel on the curb, a measurement input to the main control 70 unit from the tilt angle sensor and/or the gyroscope and G-sensors 31, 51 detects the inclined position of the rear frame section 50. The main controller 70 now causes the tilting drive 80 to rotate such that the front frame section 10 tilts upright.

To ensure that the front frame section 10 even remains stably upright while driving over uneven surfaces, the controller 70 controlling the tilting drive 80 based on driver steering input is adapted to allow the pinion 81 to move freely along the toothed surface 88 of the rack 85 around a neutral position in which the front frame section is substantially vertical when no steering input is provided. Thus when no steering input is provided to the tilting drive 80, the pinion 81 is positioned along the toothed surface 88 of the tilting member 85 such that the front frame section 10 of the vehicle 100 is in an upright position which is substantially vertical, which position along the toothed surface 88 defines the neutral position. In the neutral position only a low torque acts on the pinion 81, allowing the gear 81 of the tilting drive 80 to freely move along the toothed surface 88 around this neutral position. As a result no shocks are transmitted to the gear 81 and toothed surface 88, resulting in the wear of both elements, which can therefore be of relatively light-weight construction. Additionally, driver comfort is ensured as little to no forces acting on the rear frame section 50 due to ground surface G unevenness are being transmitted to the handle bar 16 or result in substantial additional tilting of the front frame section 10 of the vehicle with respect to the vertical position.

When a steering input is provided which results in the vehicle 100 tilting, the pinion 81 is operated at a high torque. The relation between the sensors, controller 70, battery and drive and tilt motors 65, 66, 80 is further described for FIG. 7.

Figure 7:
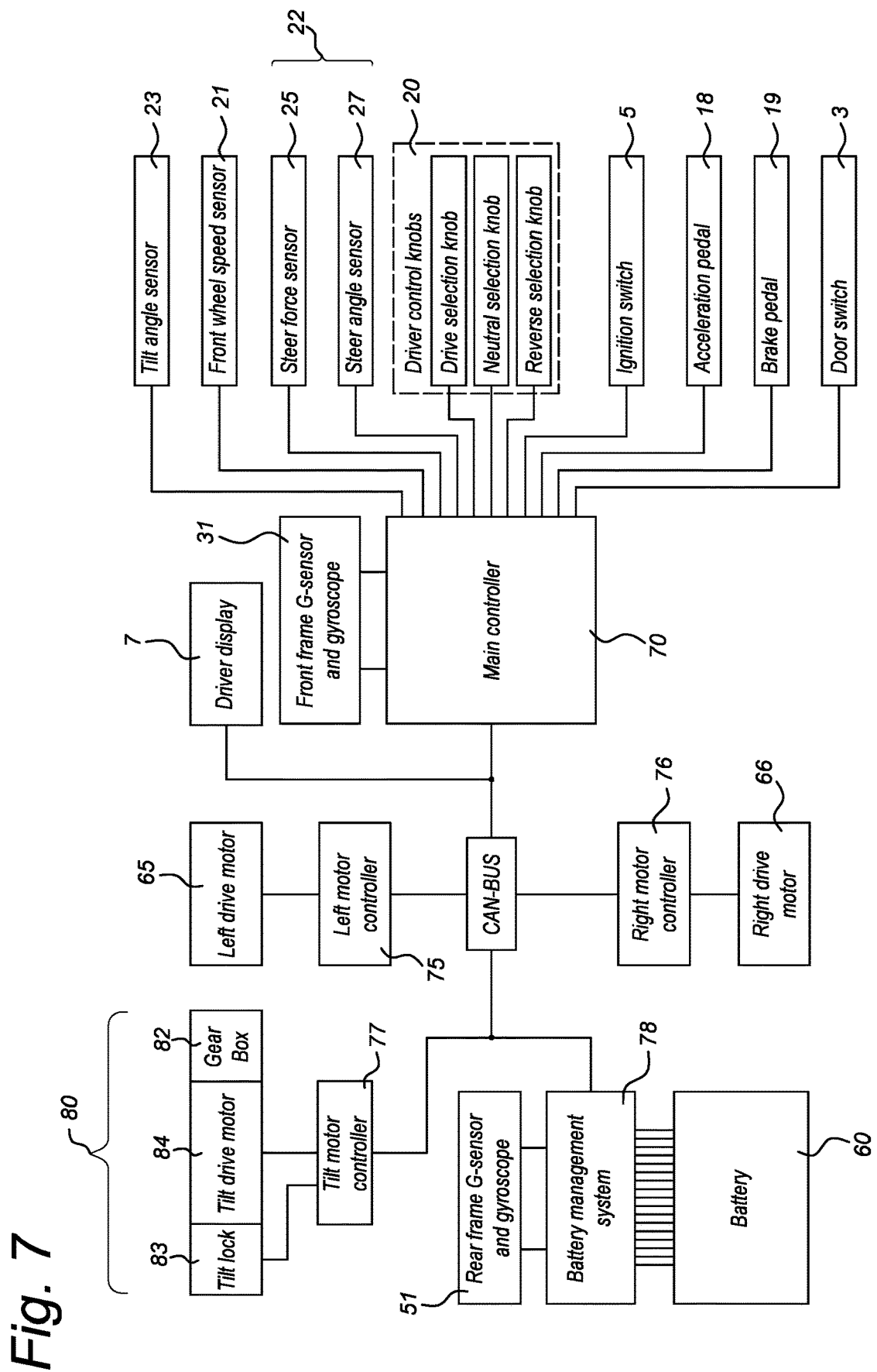
FIG. 7 shows a schematic overview of the control system for balancing the tilting vehicle of FIG. 1.

FIG. 7 shows a schematic overview of the control system for controlling the tilting vehicle of FIG. 1. The schematic shows a speed sensor 21, a tilt angle sensor 23, a steering force sensor 25, a steering angle sensor 27, driver selection knobs 20, an ignition switch 5, a driver display 7, the acceleration pedal 18, the brake pedal 19, a door switch 3, the front frame G-sensor and gyroscope 31, the rear frame G-sensor and gyroscope 51, the main controller 70, the battery management system 78, the battery 60, the electric drive motors 65, 66, motor controllers 75, 76, the tilting drive 80 and a tilt motor controller 77. All signals from all sensors are conducted via electric wires to an input side of the main control unit 70. At an output side of the main controller 70, the electromotor 84 of the tilting drive 80 and motors 65, 66 are also connected via electric wires, for receiving control signals from the main controller 70 and for providing information to the controller 70, such as motor rotation speed, motor position, motor amperage, motor voltage and motor temperature. Further, the tilt motor 80 and two wheel hub motors 65, 66 are each individually connected to the battery 60, via the battery management system 78. Through these individual connections, an exact power distribution can be achieved, which ultimately leads to energy savings.

When the driver desires to change direction, and therefore exerts a moment on the handle bar 16, this moment will be monitored by the steering force sensor 25. Depending on the speed of the vehicle, as measured by the speed sensor 21, the controller 70 will determine a required tilting angle and moment required on the rear frame section 10 for balanced driving through a bend and a corresponding required individual torque for each of the drive wheels 55, 56. In addition to controlling the tilting drive 80, the controller 70 forwards signals to the wheel hub motors 65, 66 such that the a difference in torque between the wheels 55,56 generates the required moment. In doing so, one-wheel hub motor is run at a higher torque than the other wheel hub motor, wherein the higher amount required by this one motor can be routed directly from the battery 60 or in the situation where the other wheel 56 is slowed down for achieving said torque difference, energy may be regenerated from the braking action. Any regenerated energy is lead to the battery management system 78 and either directly fed into the other wheel hub motor and tilting drive 80 as required, thereby saving energy from the battery 60. In the situation where more energy is regenerated than required from either motor, the regenerated energy is lead into the battery 60 for storage. The redistribution of energy by the battery management system 78 to one or more motors and/or battery 60 can also occur when energy is being regenerated when driving in a straight direction, during braking of both wheels and/or when driving downhill.

When the vehicle 100 is switched on, the controller 70 receives an energy level indication from the battery 60 through the battery management system 78, and forwards the information to the drive display 7, allowing the driver of the vehicle to keep informed of the available energy and refuelling requirements. In the event that the vehicle 100 is not refuelled despite running low on energy and to prevent any unsafe traffic situations from occurring in the event the energy runs out during driving, the controller 70 is preprogrammed to reduce the energy supplied to the electric drive motors 65,66 when the indicated energy level is below an energy level threshold value, while fully maintaining the energy supply to the tilting drive 80 as required. Thus once the amount of energy stored in the battery 60 drops below the predetermined threshold value, the maximum driving torque supplied by the driving motors 65, 66 is gradually reduced by the controller 70, while the energy supply directed to the tilting motor 80 is maintained as required to provide the amount of tilt matching with the steering motion measured by the steering force and angle sensors 25, 27 and vehicle velocity measured by the speed sensor 21. Through the reduced energy mode, the vehicle can safely be driven to a refuelling location, albeit at lower maximum speeds.

The present invention has been described above with reference to a number of exemplary embodiments as shown in the drawings. Modifications and alternative implementations of some parts or elements are possible and are included in the scope of protection as defined in the appended claims. For example, the front frame and rear frame sections could easily be supplied with additional wheels whilst maintaining the functionality of the tilting vehicle as described for the exemplary embodiments as shown in the drawings.

The invention claimed is:

1. A tilting vehicle comprising
a rear frame section having two drive wheels and
a front frame section having at least one front wheel, connected to the rear frame section such as to be tiltable about a tilt axis (TA) that extends in a length direction,
the front frame section carrying a driver seat,
the rear frame section comprising an electric propulsion drive for rotating the drive wheels, an electric tilting drive for tilting the front frame section (10) about the tilting axis (TA) and a power generating unit, the front wheel being rotatable about a steering axis (SA) that extends transversely to the tilt axis (TA), wherein the tilting vehicle further comprises a controller, which is with an output connected to the propulsion drive and to the tilting drive and which is with an input connected to the power generating unit, the controller receiving an energy level indication from the power generating unit and being adapted to reduce energy supplied to the propulsion drive when the indicated energy level of the power generating unit is below an energy level threshold value, while maintaining energy supply to the tilting drive above a predetermined minimum value.

2. The tilting vehicle according to claim 1, wherein when the energy level of the generating unit comes below a certain energy level, the energy supply to the electric propulsion drive is cut off, whereby the tilting drive will have a sufficient energy level to ensure continuation of the tilting drive's function.

3. Tilting vehicle according to claim 1, wherein the vehicle is self-balancing.

4. The tilting vehicle according to claim 1, wherein the power generating unit is an electric power generating unit.

5. The tilting vehicle according to claim 1, wherein the controller receives a velocity signal and a steering input signal indicating a driving direction, the controller being adapted to operate the tilting drive as long as a velocity of the vehicle is above a predetermined threshold value.

6. The tilting vehicle according to claim 1, wherein the propulsion drive comprises a respective electric drive motor connected to each of the drive wheels, the controller being connected to the electric drive motors of the drive wheels.

7. The tilting vehicle according to claim 1, wherein the tilting drive comprises an electric motor situated at a predetermined distance from the tilt axis (TA) with a drive gear, and a tilting member having a toothed surface engaging with the drive gear such that the tilting member can be displaced transversely to the tilting axis (TA) by rotation of the drive gear, whereby the tilting drive and the tilting member are connected to the respective front and rear frame sections.

8. The tilting vehicle according to claim 1, wherein the power generating unit comprises a battery, providing power to the drive wheels and to the tilting drive.

9. The tilting vehicle according to claim 7, wherein the electric motor comprises a housing with a motor member, a transmission gear connected to the drive gear and a resilient brake member which blocks rotation of the drive gear when no electrical energy is supplied to the motor member.

10. The tilting vehicle according to claim 6, wherein the controller is adapted to transport energy that is generated during braking, from the electric drive motors to the tilting drive.

* * * * *